US009557847B2

(12) United States Patent
Chen et al.

(10) Patent No.: US 9,557,847 B2
(45) Date of Patent: Jan. 31, 2017

(54) TOUCH PANEL, TOUCH DISPLAY PANEL AND TOUCH SIGNAL SENSING METHOD (71) Applicant: AU Optronics Corp., Hsin-Chu (TW)

(72) Inventors: Chien-Yu Chen, Hsin-Chu (TW); Wen-Chi Chuang, Hsin-Chu (TW); Yi-Chi Chen, Hsin-Chu (TW); Ching-Chien Yuan, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 196 days.

(21) Appl. No.: 14/264,067

(22) Filed: Apr. 29, 2014

(65) Prior Publication Data

US 2015/0234520 A1    Aug. 20, 2015

(30) Foreign Application Priority Data

Feb. 19, 2014    (TW) .............................. 103105557 A (51) Int. Cl.
G06F 3/041    (2006.01)
G06F 3/0488    (2013.01)
G06F 3/044    (2006.01)

(52) U.S. Cl.
CPC ............. *G06F 3/0416* (2013.01); *G06F 3/044* (2013.01); *G06F 3/0412* (2013.01); *G06F 3/04886* (2013.01)

(58) Field of Classification Search
CPC ...... G06F 3/0416; G06F 3/044; G06F 3/0412; G06F 3/04886
See application file for complete search history.

(56) References Cited

U.S. PATENT DOCUMENTS

| 8,624,856 B2 * | 1/2014 | Kim ................... G02F 1/13338 345/173 |
| 2009/0303189 A1 | 12/2009 | Grunthaner |
| 2012/0242585 A1 * | 9/2012 | Jones ..................... G06F 3/044 345/173 |

FOREIGN PATENT DOCUMENTS

| CN | 101699379 | | 4/2010 |
| CN | 102436324 | | 5/2012 |
| CN | 10292426 A1 * | 2/2013 |
| CN | 102929426 | | 2/2013 |
| TW | 201214220 | | 4/2012 |
| TW | M472253 | | 2/2014 |

\* cited by examiner

*Primary Examiner* — Andrew Sasinowski
(74) *Attorney, Agent, or Firm* — McClure, Qualey & Rodack, LLP (57) ABSTRACT

A touch panel includes a substrate, a sensing array, a plurality of first connection lines and at least two button sensing pads. The substrate has an active region and a peripheral region disposed on at least one side of the active region. The sensing array is disposed in the active region, which includes a plurality of first sensing electrode series disposed in the active region along a first direction and a plurality of second sensing electrode series disposed in the active region along a second direction. The first and second sensing electrode series intersect and form a plurality of sensing units. The first connection lines are disposed in the peripheral region and electrically connected to the first sensing electrode series respectively. The at least two button sensing pads are disposed in the peripheral region, and electrically connected to at least two first connection lines respectively to form a virtual button.

17 Claims, 9 Drawing Sheets

TOUCH PANEL, TOUCH DISPLAY PANEL AND TOUCH SIGNAL SENSING METHOD

BACKGROUND OF THE INVENTION

1. Field of the Invention

The present invention is related to a touch panel, a touch display panel and a touch signal sensing method, and more particularly, to a touch panel and a touch display panel able to realize slim border design and a touch signal sensing method thereof.

2. Description of the Prior Art

Touch panel has been widely used in the input interfaces of electronic products for its properties of human-machine interaction. In recent years, more and more consumer electronics, such as smart phones, GPS navigator systems, tablet computer and laptop computers are employed with touch display panels.

In order to increase the operational facilitation for users, conventional touch panels are usually provided with some commonly-used functional button (also known to as hot keys) e.g. home button, menu button and return button in the form of physical buttons. The physical buttons include mechanical type buttons, thin film type buttons and capacitive type buttons. However, the physical button requires additional components such as printed circuit board (PCB) and conductive lines to implement its input function, which causes volume increase and layout difficulty of connection lines for electronic product.

To overcome the disadvantage of physical button, some electronic products such as smart phone and tablet computer use virtual button (also known to as virtual key) to replace physical button. The virtual button is disposed in the peripheral region of touch panel, which can implement touch input when pressed by the user. However, the virtual button itself and necessary additional connection lines would occupy most of the area of the peripheral region, and therefore the width or area of the peripheral must be increased to accommodate the virtual button and the connection lines of the virtual button as well as the connection lines of the sensing array of touch panel. Consequently, it is difficult to design a touch panel having slim border with the virtual button.

SUMMARY OF THE INVENTION

It is therefore one of the objectives of the present invention to provide a touch panel, a touch display panel and a touch signal sensing method to realize slim border design with at least one virtual button.

According to an embodiment, a touch panel is provided. The touch panel includes a substrate, a sensing array, a plurality of first connection lines and at least two button sensing pads. The substrate has an active region and a peripheral region disposed on at least one side of the active region. The sensing array is disposed in the active region of the substrate. The sensing array includes a plurality of first sensing electrode series disposed in the active region of the substrate along a first direction, and a plurality of second sensing electrode series, disposed in the active region of the substrate along a second direction, where the first sensing electrode series and the second sensing electrode series intersect and form a plurality of sensing units. The first connection lines are disposed in the peripheral region of the substrate and electrically connected to the first sensing electrode series respectively. The at least two button sensing pads are disposed in the peripheral region of the substrate, and the button sensing pads are electrically connected to at least two of the first connection lines respectively to form a virtual button.

According to another embodiment of the present invention, a touch display panel is provided. The touch display panel includes a display panel and the aforementioned touch panel. The display panel has a display surface, and the aforementioned touch panel is disposed on the display surface of the display panel.

According to still another embodiment of the present invention, a touch signal sensing method is provided. The touch signal sensing method includes the following steps. A touch panel is provided. The touch panel includes a substrate, a sensing array, a plurality of first connection lines and at least two button sensing pads. The substrate has an active region and a peripheral region disposed on at least one side of the active region. The sensing array is disposed in the active region of the substrate. The sensing array includes a plurality of first sensing electrode series disposed in the active region of the substrate along a first direction, and a plurality of second sensing electrode series, disposed in the active region of the substrate along a second direction, where the first sensing electrode series and the second sensing electrode series intersect and form a plurality of sensing units. The first connection lines are disposed in the peripheral region of the substrate and electrically connected to the first sensing electrode series respectively. The at least two button sensing pads are disposed in the peripheral region of the substrate, and the button sensing pads are electrically connected to at least two of the first connection lines respectively to form a virtual button. Whether a user implements a touch input on the virtual button or whether a user implements the touch input on the sensing array is determined based on signals of the first connection lines.

The virtual button of the touch panel and the touch display panel of the present invention is formed by two or more button sensing pads, and the button sensing pads are electrically connected to the first connection lines, which are configured to deliver the signals of the first sensing electrode series, i.e. each button sensing pad is a portion of its corresponding first connection line. Therefore, no extra component for providing the virtual button with touch input function is required, and the width or area of the peripheral region is not required to be enlarged. Consequently, ultra slim border design with the virtual button can be realized. In addition, the touch signal sensing method can be applied to the touch panel to determine whether the user performs the touch input on the virtual button or whether the user performs the touch input on the sensing array by analyzing the signal difference with proper algorithm.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, preferred embodiments will be made in detail. The preferred embodiments of the present invention are illustrated in the accompanying drawings with numbered elements.

Figure 1:
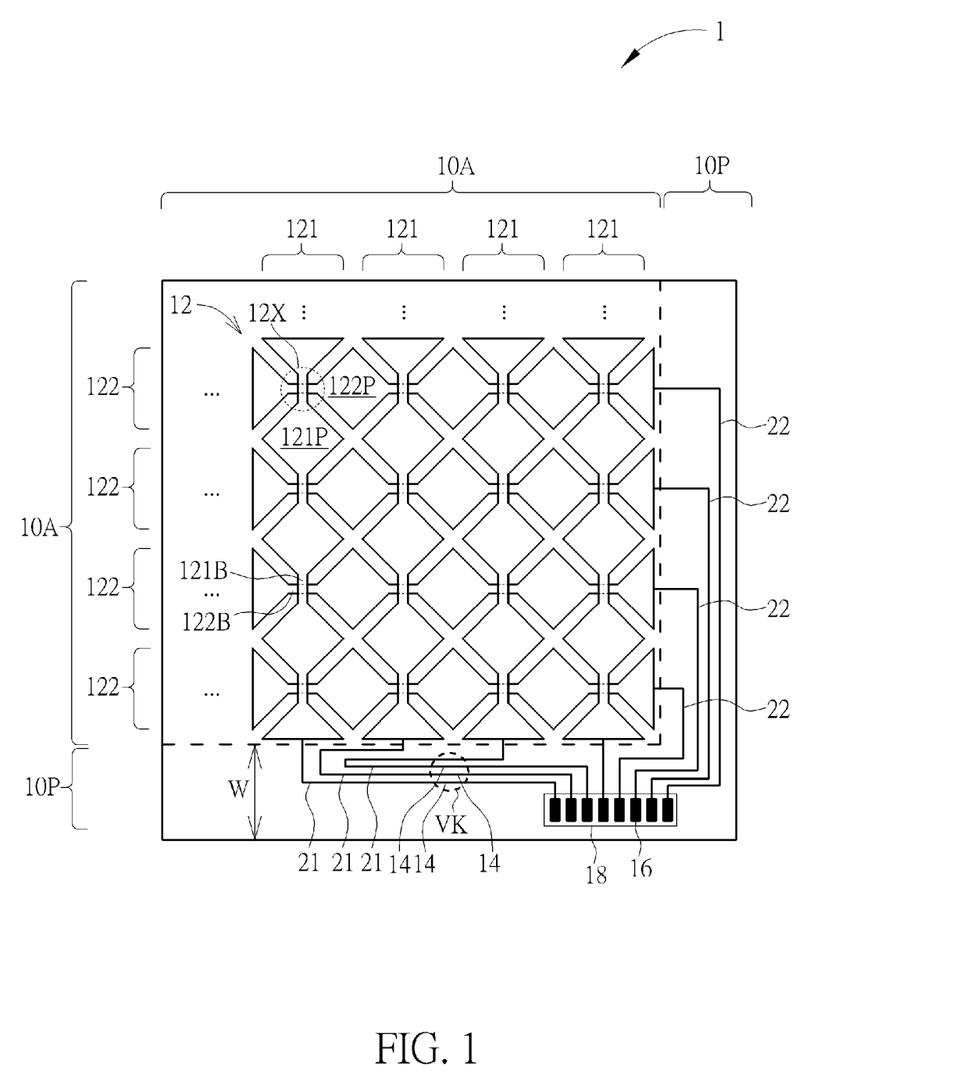
FIG. 1 is a schematic diagram illustrating a touch panel according to a first embodiment of the present invention.
Figure 2:
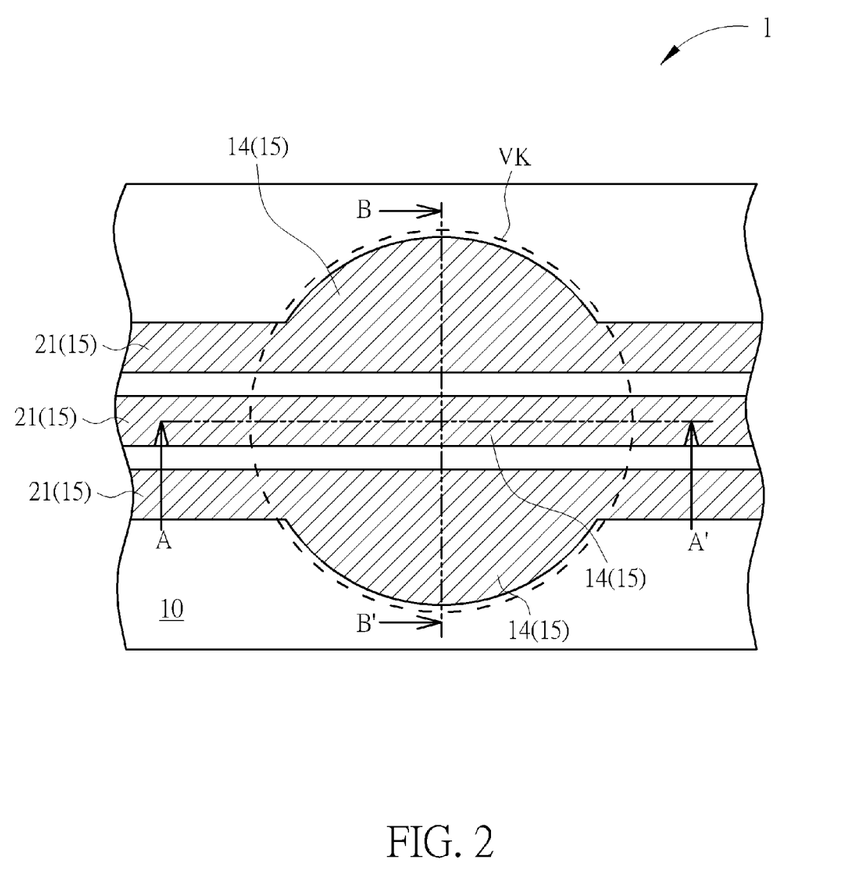
FIG. 2 is a top view illustrating a touch panel according to a first embodiment of the present invention.
Figure 3:
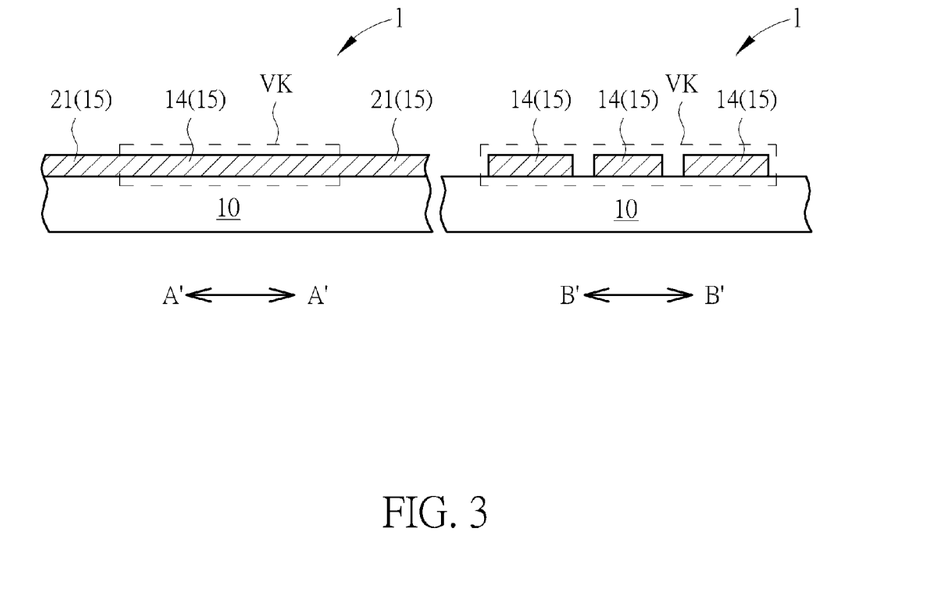
FIG. 3 is a cross-sectional view taken along line A-A' and line B-B' illustrating a touch panel of FIG. 2.

Refer to FIGS. 1-3. FIG. 1 is a schematic diagram illustrating a touch panel according to a first embodiment of the present invention, FIG. 2 is a top view illustrating a touch panel according to a first embodiment of the present invention and FIG. 3 is a cross-sectional view taken along line A-A' and line B-B' illustrating a touch panel of FIG. 2. As shown in FIGS. 1-3, the touch panel 1 of this embodiment includes a substrate 10, a sensing array 12, a plurality of first connection lines 21, a plurality of second connection lines 22 and at least two button sensing pads 14. The substrate 10 has an active region 10A and a peripheral region 10P disposed on at least one side of the active region 10A. For example, the peripheral region 10P is disposed on two sides (right side and downside) of the active region 10A, but not limited thereto. In other variant embodiment, the peripheral region 10P may be disposed on any one side, any three sides or all four sides of the active region 10A. The sensing array 12 is disposed in the active region 10A of the substrate 10. The sensing array 12 includes a plurality of a plurality of first sensing electrode series 121 and a plurality of second sensing electrode series 122, where the first sensing electrode series 121 are disposed in the active region 10A of the substrate 10 along a first direction D1, the second sensing electrode series 122 are disposed in the active region 10A of the substrate 10 along a second direction D2, and the first sensing electrode series 121 and the second sensing electrode series 122 intersect and form a plurality of sensing units 12X. In this embodiment, the first direction D1 and the second direction D2 may be substantially perpendicular to each other, for example, the first direction D1 is the vertical direction and the second direction D2 is the horizontal direction of FIG. 1, but not limited thereto. In other variant embodiments, the first direction D1 and the second direction D2 may be non-perpendicular to each other. Each first sensing electrode series 121 includes a plurality of first sensing electrodes 121P and a plurality of first bridge lines 121B, and each first bridge lines 121B is disposed between two adjacent first sensing electrodes 121P and electrically connected to two adjacent first sensing electrodes 121P. Each second sensing electrode series 122 includes a plurality of second sensing electrodes 122P and a plurality of second bridge lines 122B, and each second bridge lines 122B is disposed two adjacent second sensing electrodes 122P and electrically connected to two adjacent second sensing electrodes 122P. The shape of the first sensing electrode 121P and the second sensing electrode 122P may be rhombus, rectangular or any other appropriate shape. The first sensing electrodes 121P and the second sensing electrodes 122P may be formed by the same patterned conductive layer or different pattern conductive layers, and the first sensing electrodes 121P and the second sensing electrodes 122P may include transparent conductive material e.g. indium tin oxide (ITO) or indium zinc oxide (IZO), but not limited thereto. The first bridge lines 121B and the second bridge lines 122B may be formed by the same patterned conductive layer or different pattern conductive layers, and the first bridge lines 121B and the second bridge lines 122B may include transparent conductive material e.g. ITO or IZO, or opaque conductive material e.g. metal, but not limited thereto. In one embodiment, the first sensing electrodes 121P, the second sensing electrodes 122P and the first bridge lines 121B may be formed by the same one patterned conductive layer e.g. a transparent patterned conductive layer, the second bridge lines 122B may be formed by another patterned conductive layer e.g. an opaque patterned conductive layer, and the first bridge lines 121B and the second bridge lines 122B may be electrically insulated with an insulation layer (not shown). Alternatively, in another embodiment, the first sensing electrodes 121P and the first bridge lines 121B may be formed by the same one patterned conductive layer e.g. a transparent patterned conductive layer, the second sensing electrodes 122P and the second bridge lines 122B may be formed by another patterned conductive layer e.g. another transparent patterned conductive layer, and the first bridge lines 121B and the second bridge lines 122B may be electrically insulated with an insulation layer (not shown). The first connection lines 21 are disposed in the peripheral region 10P of the substrate 10 and electrically connected to the first sensing electrode series 121, respectively. The second connection lines 22 are disposed in the peripheral region 10P of the substrate 10 and electrically connected to the second sensing electrode series 122, respectively. The first connection line 21 may be a single-layered connection line comprising an opaque conductive material e.g. gold (Au), aluminum (Al), copper (Cu), silver (Ag), chromium (Cr), titanium (Ti), molybdenum (Mo), neodymium (Nd) or an alloy thereof or a transparent conductive material e.g. ITO or IZO, or a multi-layered connection line comprising an opaque conductive material and a transparent conductive material stacking to each other e.g. a multi-layered connection line including metal and ITO stacking to each other. The second connection line 22 and the first connection line 21 may be made of the same material(s) or different materials.

In this embodiment, the at least two button sensing pads 14 are disposed in the peripheral region 10P of the substrate 10, and the at least two button sensing pads 14 are electrically connected to at least two of the first connection lines 21 to form a virtual button VK. For example, the virtual button VK are formed by three button sensing pads 14, but not limited thereto. In other variant embodiments, a virtual button VK may be formed by two button sensing pads 14 or more button sensing pads 14 such as four, five or even more button sensing pads 14. The shape and area of the button sensing pads 14 may be the same or different. In this embodiment, one virtual button VK is exemplarily illustrated, but the number of virtual button VK may be two or more. The virtual button VK may be, for example, a home button, a menu button, a return button or other hot key with default function. In addition, the touch panel 1 may further include a plurality of connection pads 16 and at least one driving IC 18. The connection pads 16 are electrically connected to the first sensing electrode series 121 and the second sensing electrode series 122, respectively. Specifically, each connection pads 16 is electrically connected to the corresponding first sensing electrode series 121 via the first connection line 21, i.e. the connection pad 16 and the first sensing electrode series 121 are electrically connected to two ends of the first connection line 21, respectively. Each connection pads 16 is electrically connected to the corresponding second sensing electrode series 122 via the second connection line 22, i.e. the connection pad 16 and the second sensing electrode series 122 are electrically connected to two ends of the second connection line 22, respectively. The connection pads 16 are further electrically connected to the driving IC 18 such that the driving IC 18 is electrically connected to the first sensing electrode series 121 via a portion of the connection pads 16 and the first connection lines 21, and electrically connected to the second sensing electrode series 122 via the other portion of the connection pads 16 and the second connection lines 22.

The touch panel 1 of this embodiment may be a mutual capacitance type touch panel, where each of the first sensing electrode series 121 may include a touch signal receiving electrode series and each of the second sensing series 122 may include a touch signal driving electrode series; or each of the first sensing electrode series 121 may include a touch signal driving electrode series and each of the second sensing series 122 may include a touch signal receiving electrode series. In a variant embodiment, the touch panel may be a self capacitance type touch panel.

The virtual button VK of the touch panel 1 is formed by two or more button sensing pads 14, and the button sensing pads 14 are electrically connected to the first connection lines 21, which are configured to deliver the signals of the first sensing electrode series 121. In other words, each button sensing pad 14 is a portion of the corresponding first connection line 21. Therefore, there is no need to further dispose more first sensing pad 121P and second sensing pad 122 in the peripheral region 10P, no need to further dispose any components for providing the virtual button VK with touch input function, and no need to increase the width or area of the peripheral region 10P. Consequently, the border width W of the peripheral region 10P of the touch panel 1 can be reduced to fulfill slim border design.

As shown in FIG. 2 and FIG. 3, each button sensing pad 14 and the corresponding first connection line 21 electrically connected thereto may be made of the same conductive material layer 15, and the material of the conductive material layer 15 may be the aforementioned opaque or transparent conductive material. In a variant embodiment, each button sensing pad 14 and the corresponding first connection line 21 electrically connected thereto may be made of a multi-layered conductive material layer including two or more layers of conductive materials, and the material of each conductive material layer may be individually opaque or transparent conductive material. Furthermore, a pattern or an image that visualizes or displays the function of the virtual button VK may be disposed in the region where the virtual button VK locates so that users can be aware of the function of the virtual button VK.

Figure 4:
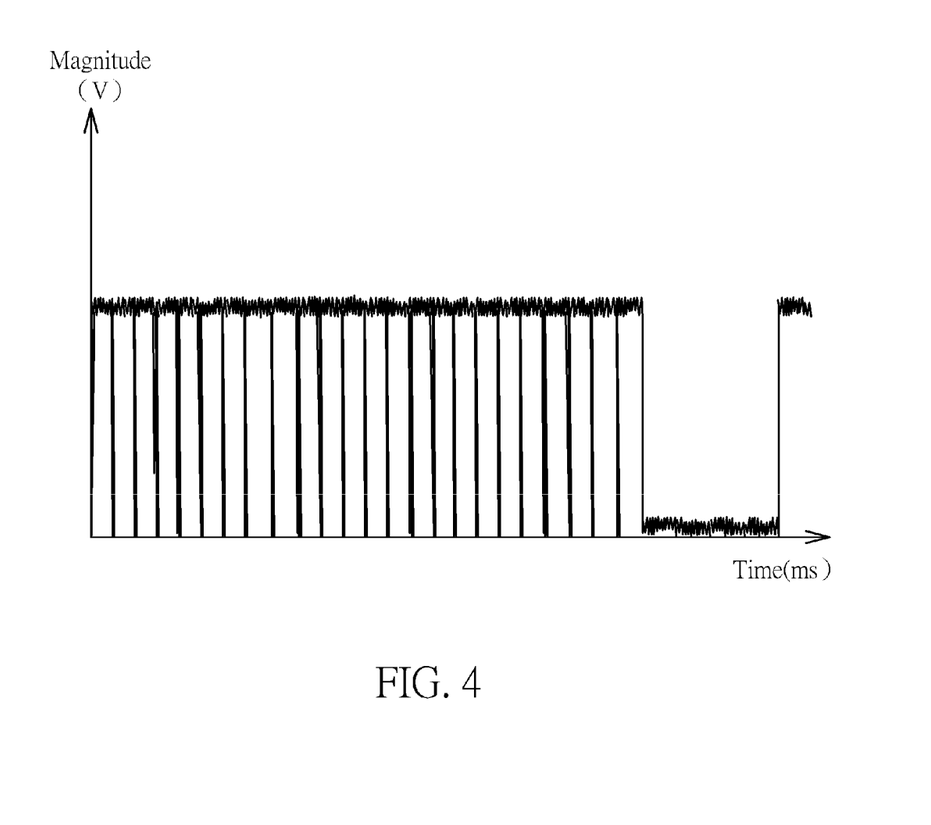
FIG. 4 is a schematic signal diagram illustrating the condition when no touch input is implemented on the sensing array and the virtual button of the touch panel of this embodiment.
Figure 5:
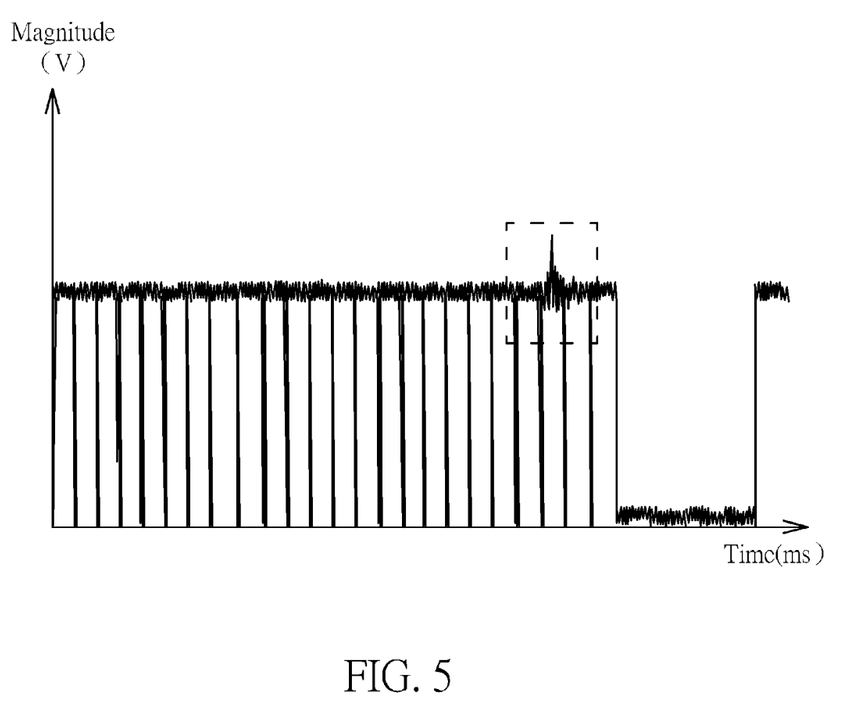
FIG. 5 is a schematic signal diagram illustrating the condition when touch input is implemented on the sensing array of the touch panel of this embodiment.
Figure 6:
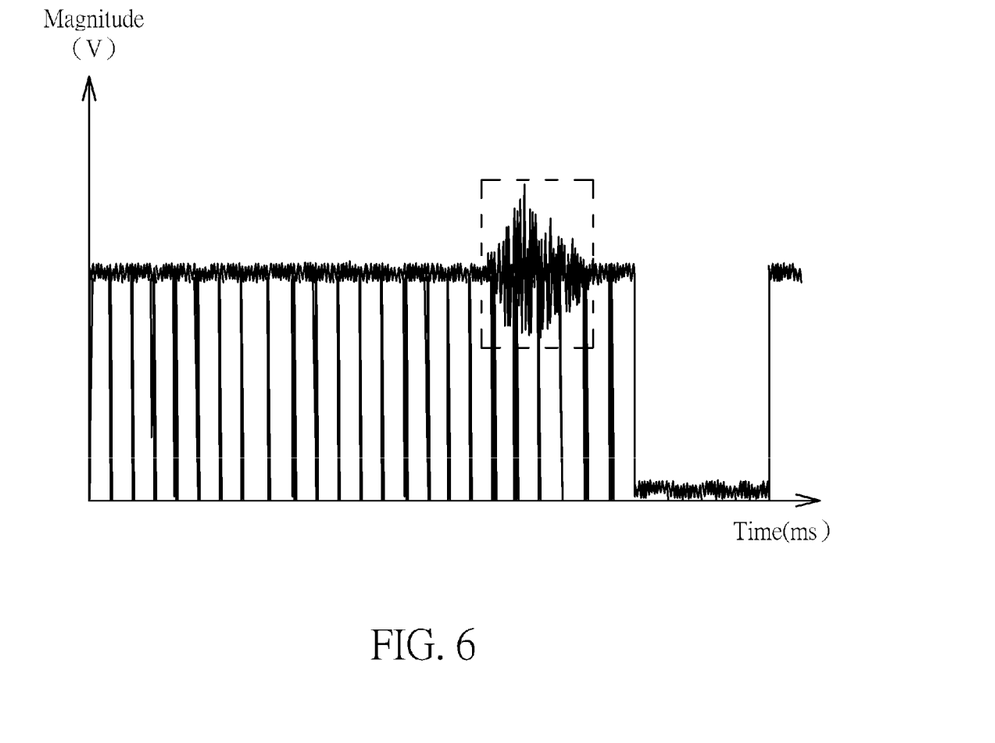
FIG. 6 is a schematic signal diagram illustrating the condition when touch input is implemented on the virtual button of the touch panel of this embodiment.

Refer to FIGS. 4-6, as well as FIGS. 1-3. FIG. 4 is a schematic signal diagram illustrating the condition when no touch input is implemented on the sensing array and the virtual button of the touch panel of this embodiment, FIG. 5 is a schematic signal diagram illustrating the condition when touch input is implemented on the sensing array of the touch panel of this embodiment, and FIG. 6 is a schematic signal diagram illustrating the condition when touch input is implemented on the virtual button of the touch panel of this embodiment, where the x axis represents time (unit: micro second), and the y axis represents signal magnitude (unit: Volt). In this embodiment, a mutual capacitance type touch panel is exemplarily used, where each of the first sensing electrode series 121 is a touch signal receiving electrode series and each of the second sensing series 122 is a touch signal driving electrode series, but not limited thereto. As shown in FIG. 4, in touch input mode, when each second sensing series 122 sends a driving signal sequentially in a scanning manner, a receiving signal will be generated in each first sensing series 121 due to capacitive coupling effect, and these receiving signals will be delivered to the driving IC 18 via the first connection lines 21. If the receiving signals of all first connection lines 21 are the same, for example all the receiving signals have the same magnitude or waveform, it is determined that no touch input is implemented on the sensing array 12 and the virtual button VK of the touch panel 1. As shown in FIG. 5, if the receiving signal of one first connection line 21 is different from the receiving signals of other first connection lines 21, it is determined that touch input is implemented on the sensing array 12 of the touch panel 1. For example, if the magnitude or waveform of the receiving signal of one first connection line 21 is different from the magnitudes or waveforms of the receiving signals of the other first connection lines 21, it is determined that touch input is implemented on the sensing array 12 of the touch panel 1. The location of the first sensing electrode series 121 that the very first connection line 21 is electrically connected to can be used to determine one of the Coordinates e.g. X Coordinate. In addition, the other Coordinate e.g. Y Coordinate can be determined based on the timing of the driving signal sending by the second sensing electrode series 122. Accordingly, the Coordinates of the touch input point in the sensing array 12 can be calculated. As shown in FIG. 6, when the receiving signals of the plurality of the first connection lines 21 electrically connected to the button sensing pads 14 are different from the receiving signals of the other first connection lines 21 not electrically connected to the button sensing pads 14, it is determined that touch input is implemented on the virtual button VK of the touch panel 1. For example, if the magnitudes or waveforms of receiving signals of the first connection lines 21 electrically connected to the button sensing pads 14 are different from the magnitudes or waveforms of the other first connection line 21 not electrically connected to the button sensing pads 14, it is determined that touch input is implemented on the virtual button VK of the touch panel 1.

The virtual button VK of the touch panel 1 of this embodiment is formed by two or more button sensing pads 14, and each button sensing pad 14 is electrically connected to the corresponding first connection line 21, which is configured to deliver the signal of the first sensing electrode series 121. In other words, each button sensing pad 14 is a portion of the corresponding first connection line 21. Therefore, no extra component for providing the virtual button VK with touch input function e.g. extra connection lines is required, and the width or area of the peripheral region 10P is not required to be enlarged. Consequently, slim border design can be realized. In addition, the touch signal sensing method can be applied to the touch panel 1 to determine whether the user performs touch input on the virtual button VK or whether the user performs touch input on the sensing array 12 by analyzing the signals of the first connection lines. Furthermore, the touch signal sensing method is not limited to be applied to the touch panel 1 where the first sensing electrode series 121 are touch signal receiving electrode series and the second sensing series 122 are touch signal driving electrode series. In other variant embodiments, the touch signal sensing method may be applied to a touch panel where the first sensing electrode series 121 are touch signal driving electrode series and the second sensing series 122 are touch signal receiving electrode series. In such case, the touch signal sensing method can determine whether the user performs touch input on the virtual button VK or whether the user performs touch input on the sensing array 12 by analyzing the signals received by the touch signal driving electrode series. Alternatively, the touch signal sensing method can be applied to other types of touch panel e.g. self capacitance type touch panel, and can determine whether the user performs touch input on the virtual button VK or whether the user performs touch input on the sensing array 12 by appropriate algorithm. In conclusion, the touch signal sensing method can determine whether the user performs touch input on the virtual button VK or whether the user performs touch input on the sensing array 12 by analyzing the signal difference with proper algorithm.

The touch panel is not limited by the aforementioned embodiment, and may have other different preferred embodiments. To simplify the description, the identical components in each of the following embodiments are marked with identical symbols. For making it easier to compare the difference between the embodiments, the following description will detail the dissimilarities among different embodiments and the identical features will not be redundantly described.

Figure 7:
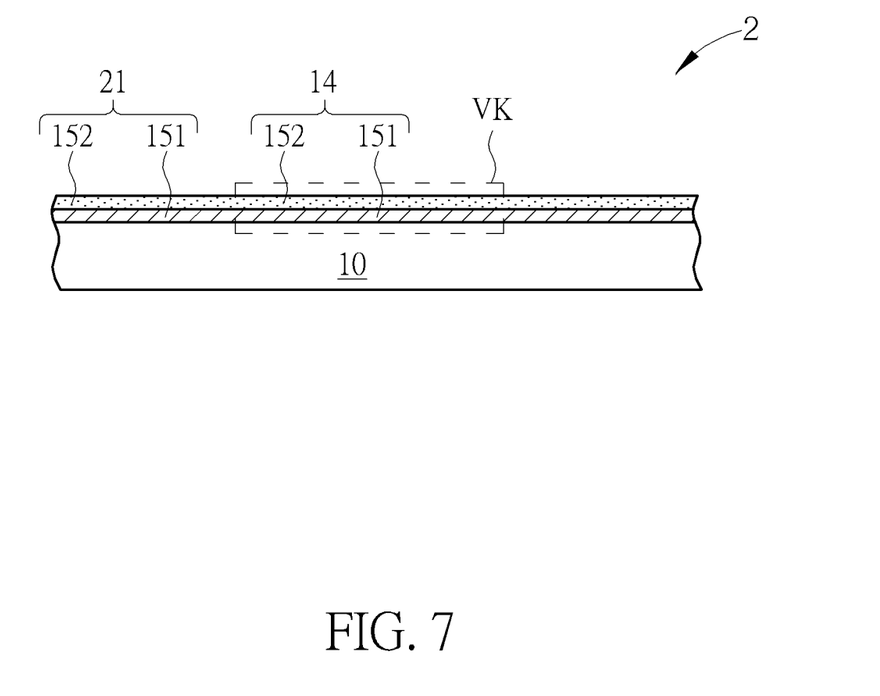
FIG. 7 is a schematic diagram illustrating a touch panel according to a second embodiment of the present invention.

Refer to FIG. 7. FIG. 7 is a schematic diagram illustrating a touch panel according to a second embodiment of the present invention. As shown in FIG. 7, the button sensing pads 14 and the first connection lines 21 of the touch panel 2 are formed by a multi-layered conductive material layer including a plurality of stacking layers of conductive materials. For example, the stacking layers include a first conductive material layer 151 and a second conductive material layer 152, which can be individually selected from opaque or transparent conductive material. The opaque conductive material may include at least one of gold (Au), aluminum (Al), copper (Cu), silver (Ag), chromium (Cr), titanium (Ti), molybdenum (Mo), neodymium (Nd) or an alloy thereof, but not limited thereto. The transparent conductive material may include ITO, IZO or other appropriate transparent conductive materials. For example, the first conductive material layer 151 may be opaque conductive material and the second conductive material layer 152 may be transparent conductive material, but not limited thereto.

Figure 8:
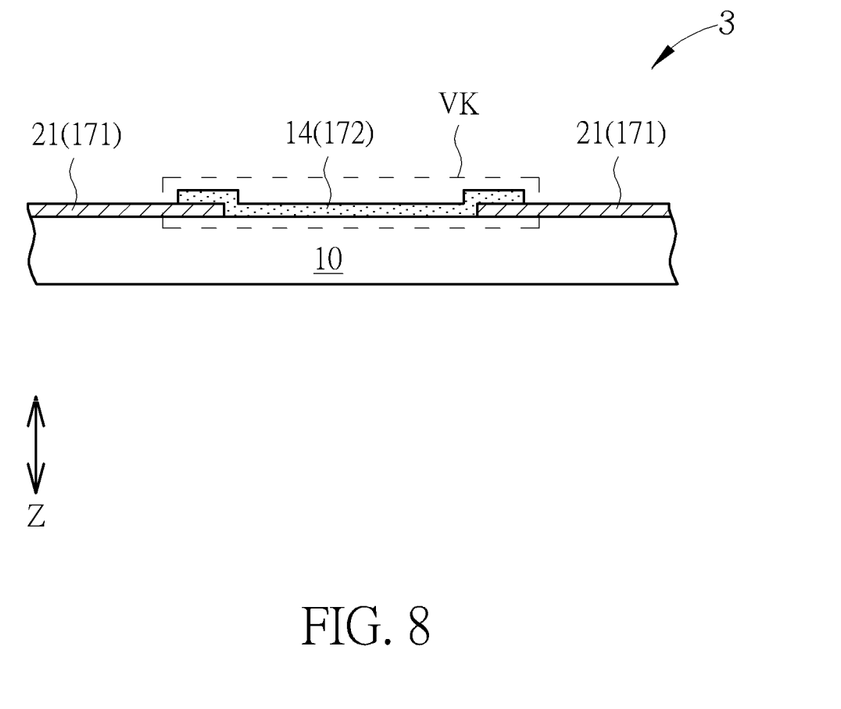
FIG. 8 is a schematic diagram illustrating a touch panel according to a third embodiment of the present invention.

Refer to FIG. 8. FIG. 8 is a schematic diagram illustrating a touch panel according to a third embodiment of the present invention. As shown in FIG. 8, the button sensing pads 14 and the first connection lines 21 of the touch panel 3 are formed by different layers of conductive material layers. For example, the first connection lines 21 are formed by a first conductive material layer 171, and the button sensing pads 14 are formed by a second conductive material layer 172. The first conductive material layer 171 may include opaque conductive material, and the second conductive material layer 172 may include transparent conductive material, but not limited thereto. In addition, each of the button sensing pads 14 and the first connection line 21 electrically connected to the button sensing pad 14 at least partially overlap to each other in a vertical projection direction Z, and each of the button sensing pads 14 is inserted in between the first connection line 21 electrically connected to the button sensing pad 14.

Figure 9:
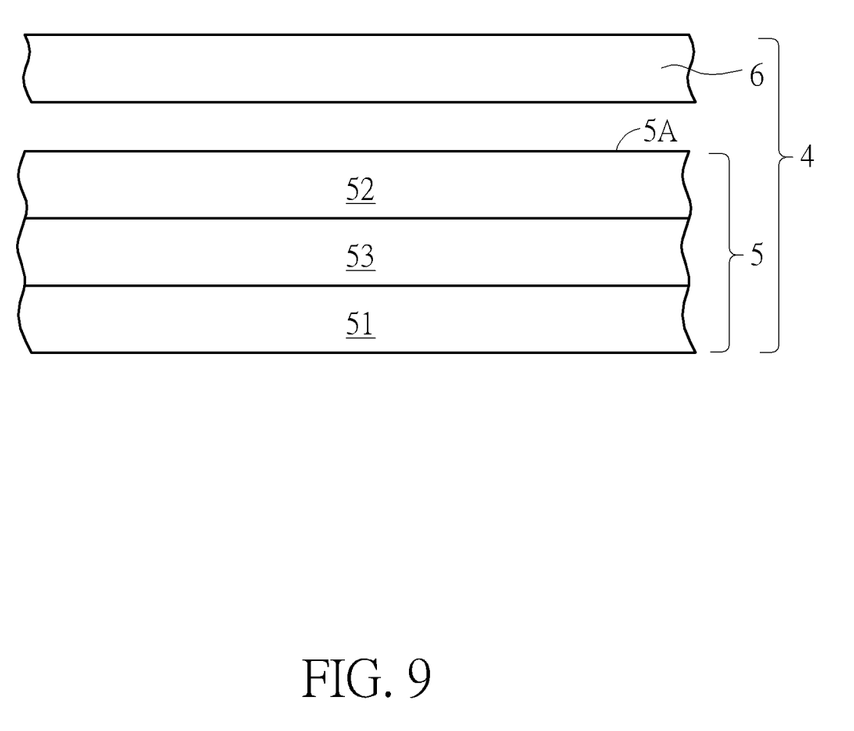
FIG. 9 is a schematic diagram illustrating a touch display panel according to an embodiment of the present invention.

Refer to FIG. 9. FIG. 9 is a schematic diagram illustrating a touch display panel according to an embodiment of the present invention. As shown in FIG. 9, the touch display panel 4 includes a display panel 5 and a touch panel 6. The display panel 5 includes a first substrate 51, a second substrate 52 and a display medium layer 53. The first substrate 51 and the second substrate 52 are disposed opposite to each other, and the display medium layer 53 is interposed between the first substrate 51 and the second substrate 52. The display panel 5 has a display surface 5A e.g. the outer surface of the second substrate 52 for displaying images to the viewer. The display panel 5 may be any type of display panel including a non-self-luminous display panel or a self-luminous display panel. The non-self-luminous display panel includes a liquid crystal display panel, an electrophoretic display panel, an electrowetting display panel or other suitable display panels. The self-luminous display panel includes an organic electroluminescent display panel, a plasma display panel, a field emission display panel or other suitable display panels. The touch panel 6 is disposed on the display surface 5A of the display panel 5. For instance, the touch panel 6 may be adhered to the display surface 5A of the display panel 5, or directly formed on the outer surface or the inner surface of the second substrate 52 of the display panel 5, which is known to those skilled in the art and not redundantly detailed. The touch panel 6 may be any one of the touch panels disclosed in the aforementioned embodiments.

In conclusion, the virtual button of the touch panel and the touch display panel of the present invention is formed by two or more button sensing pads, and the button sensing pads are electrically connected to the first connection lines, which are configured to deliver the signals of the first sensing electrode series, i.e. each button sensing pad is a portion of its corresponding first connection line. Therefore, no extra component for providing the virtual button with touch input function is required, and the width or area of the peripheral region is not required to be enlarged. Consequently, ultra slim border design with the virtual button can be realized and achieved. In addition, the touch signal sensing method can be applied to the touch panel to determine whether the user performs touch input on the virtual button or whether the user performs touch input on the sensing array by analyzing the signal difference with proper algorithm.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel, comprising:
   a substrate, having an active region and a peripheral region disposed on at least one side of the active region;
   a sensing array, disposed in the active region of the substrate, the sensing array comprising:
   a plurality of first sensing electrode series, disposed in the active region of the substrate along a first direction; and
   a plurality of second sensing electrode series, disposed in the active region of the substrate along a second direction, wherein the first sensing electrode series and the second sensing electrode series intersect and form a plurality of sensing units;

a plurality of first connection lines, disposed in the peripheral region of the substrate and electrically connected to the first sensing electrode series respectively;

at least two button sensing pads, disposed in the peripheral region of the substrate, wherein the button sensing pads are electrically connected to at least two of the first connection lines respectively to form a virtual button, and the virtual button crosses over the at least two first connection lines; and a plurality of second connection lines, disposed in the peripheral region and electrically connected to the second sensing electrode series respectively, wherein the virtual button does not cross over the second connection lines.

2. The touch panel of claim 1, wherein each of the first sensing electrode series comprises a plurality of first sensing electrodes and a plurality of first bridge lines, each of the first bridge lines is electrically connected to two adjacent first sensing electrodes, each of the second sensing electrode series comprises a plurality of second sensing electrodes and a plurality of second bridge lines, and each of the second bridge lines is electrically connected to two adjacent second sensing electrodes.

3. The touch panel of claim 1, wherein each of the first sensing electrode series comprises a touch signal receiving electrode series and each of the second sensing electrode series comprises a touch signal driving electrode series.

4. The touch panel of claim 1, wherein each of the first sensing electrode series comprises a touch signal driving electrode series and each of the second sensing electrode series comprises a touch signal receiving electrode series.

5. The touch panel of claim 1, wherein the first connection line is a single-layered connection line comprising an opaque conductive material or a transparent conductive material, or a multi-layered connection line comprising an opaque conductive material and a transparent conductive material stacking to each other.

6. The touch panel of claim 1, wherein each of the button sensing pads and the first connection line electrically connected to the button sensing pad are formed by a same conductive material layer.

7. The touch panel of claim 1, wherein each of the button sensing pads and the first connection line electrically connected to the button sensing pad at least partially overlap to each other in a vertical projection direction.

8. The touch panel of claim 1, wherein each of the button sensing pads is inserted in between the first connection line electrically connected to the button sensing pad.

9. The touch panel of claim 1, wherein the button sensing pad is a single-layered button sensing pad comprising an opaque conductive material or a transparent conductive material, or a multi-layered button sensing pad comprising an opaque conductive material and a transparent conductive material stacking to each other.

10. The touch panel of claim 1, further comprising a plurality of connection pads, wherein the connection pads are electrically connected to the first sensing electrode series and the second sensing electrode series, respectively.

11. The touch panel of claim 10, further comprising at least one driving IC, wherein each of the connection pads is electrically connected to the at least one driving IC.

12. A touch display panel, comprising:
a display panel, having a display surface; and
a touch panel, disposed on the display surface of the display panel, the touch panel comprising:
a substrate, having an active region and a peripheral region disposed on at least one side of the active region;

a sensing array, disposed in the active region of the substrate, the sensing array comprising:
a plurality of first sensing electrode series, disposed in the active region of the substrate along a first direction; and
a plurality of second sensing electrode series, disposed in the active region of the substrate along a second direction, wherein the first sensing electrode series and the second sensing electrode series intersect and form a plurality of sensing units;

a plurality of first connection lines, disposed in the peripheral region of the substrate and electrically connected to the first sensing electrode series respectively;

at least two button sensing pads, disposed in the peripheral region of the substrate, wherein the button sensing pads are electrically connected to at least two of the first connection lines respectively to form a virtual button, and the virtual button crosses over the at least two first connection lines; and a plurality of second connection lines, disposed in the peripheral region and electrically connected to the second sensing electrode series respectively, wherein the virtual button does not cross over the second connection lines.

13. A touch signal sensing method, comprising:
providing a touch panel, the touch panel comprising:
a substrate, having an active region and a peripheral region disposed on at least one side of the active region;
a sensing array, disposed in the active region of the substrate, the sensing array comprising:
a plurality of first sensing electrode series, disposed in the active region of the substrate along a first direction; and
a plurality of second sensing electrode series, disposed in the active region of the substrate along a second direction, wherein the first sensing electrode series and the second sensing electrode series intersect and form a plurality of sensing units;

a plurality of first connection lines, disposed in the peripheral region of the substrate and electrically connected to the first sensing electrode series respectively;

at least two button sensing pads, disposed in the peripheral region of the substrate, the button sensing pads electrically connected to at least two of the first connection lines respectively to form a virtual button; and a plurality of second connection lines, disposed in the peripheral region and electrically connected to the second sensing electrode series respectively, wherein the virtual button does not cross over the second connection lines; and determining whether a user implements a touch input on the virtual button or whether a user implements the touch input on the sensing array based on signals of the first connection lines.

14. The touch signal sensing method of claim 13, wherein each of the first sensing electrode series comprises a touch signal receiving electrode series and each of the second sensing electrode series comprises a touch signal driving electrode series.

15. The touch signal sensing method of claim 14, wherein the step of determining whether a user implements the touch input on the virtual button or whether a user implements the touch input on the sensing array is carried out by analyzing signals received by the touch signal receiving electrode series.

16. The touch signal sensing method of claim 13, wherein each of the first sensing electrode series comprises a touch signal driving electrode series and each of the second sensing electrode series comprises a touch signal receiving electrode series.

17. The touch signal sensing method of claim 16, wherein the step of determining whether a user implements the touch input on the virtual button or whether a user implements the touch input on the sensing array is carried out by analyzing signals received by the touch signal driving electrode series.

* * * * *